United States Patent [19]

Gross et al.

[11] 4,124,555

[45] Nov. 7, 1978

[54] WATER REDUCIBLE COATING COMPOSITIONS CONTAINING COPOLYMERS OF VINYL PYRROLIDONE AND UNSATURATED CARBOXYLIC ACID AND CONTAINING A SOLVENT AND A VOLATILE AMINE

[75] Inventors: Bill B. Gross, Stow; Michael J. Maximovich, Akron, both of Ohio

[73] Assignee: The Goodyear Tire & Rubber Company, Akron, Ohio

[21] Appl. No.: 868,257

[22] Filed: Jan. 10, 1978

[51] Int. Cl.$^2$ ............ C08L 33/02; C08L 39/06
[52] U.S. Cl. ............ 260/29.6 HN; 260/29.6 H; 260/29.6 WB; 260/29.6 TA; 260/32.8 N; 260/33.2 R; 260/33.4 R
[58] Field of Search ............ 260/29.6 HN, 29.6 H, 260/29.6 TA, 32.8 N, 33.2 R, 33.4 R, 29.6 WB

[56] References Cited

U.S. PATENT DOCUMENTS

| | | | |
|---|---|---|---|
| 3,405,084 | 10/1968 | Bohac et al. | 260/29.6 HN |
| 3,743,715 | 7/1973 | Viout et al. | 260/29.6 TA |
| 3,806,317 | 8/1974 | Viout et al. | 260/29.6 HN |
| 3,862,071 | 1/1973 | Di Carlo | 260/29.4 UA |
| 3,904,569 | 9/1975 | Hekal et al. | 260/29.6 M |
| 3,937,680 | 2/1976 | de Carle | 260/29.6 TA |
| 4,051,089 | 9/1977 | Tobias et al. | 260/29.2 UA |
| 4,064,092 | 12/1977 | Burroway et al. | 526/216 |

*Primary Examiner*—M. J. Welsh
*Attorney, Agent, or Firm*—D. B. Little

[57] ABSTRACT

Copolymers of at least two acrylate monomers such as isobutyl methacrylate and 2-ethylhexyl methacrylate, an organic acid or acid anhydride, and N-vinyl-2-pyrrolidone are incorporated into water reducible coating compositions typified by the following general formulation:

| | Parts by weight |
|---|---|
| Resin | 20 – 30 |
| Amine | 1 – 3 |
| Defoamer | .2 – .5 |
| Water soluble solvent | 10 – 11 |
| Water insoluble solvent | 2 – 4 |
| Water | 45 – 60 |

The coating compositions of the above recipe yield clear coatings with good adhesion and water resistance.

16 Claims, No Drawings

WATER REDUCIBLE COATING COMPOSITIONS CONTAINING COPOLYMERS OF VINYL PYRROLIDONE AND UNSATURATED CARBOXYLIC ACID AND CONTAINING A SOLVENT AND A VOLATILE AMINE

BACKGROUND OF THE INVENTION

This invention is in the field of coatings, in particular, water reducible coatings. For purposes of this application, a water reducible coating is defined to be a colloidal dispersion in an organic solvent and water whose resin concentration can be reduced with water or solvent, which when reduced with a coalescing solvent forms a durable coating when applied to a substrate surface. Other names applied to water reducible coatings are waterborne, water solubilized, and water-dilutable. This application relates to a particular resin formulated to be water reducible and to give good adhesion and water resistance to the final coating.

Generally, coating resins are insoluble in water. Therefore, in general practice they have been dissolved in a suitable organic solvent or dispersed in water with the aid of emulsifying or surfactant agents in order to provide a coating composition suitable for application. A serious disadvantage of organic solvent solutions is their inherent potential toxicity, flammability, and environmental pollution.

The Clean Air Act of 1970 constitutes the basis of air pollution control regulations. It provided that the Environmental Protection Agency should issue National Ambient Air Standards, which has been done. These standards provide for limitations on particulate matter, sulfur dioxide, carbon monoxide, oxides of nitrogen, hydrocarbons, and photochemical oxidants. The last two of of these, arising from coating solvents, are the major concerns to the coating industry. Many state implementation plans under the Clean Air Act have followed the general framework of the Rule 66, which was adopted by Los Angeles County, California, in 1966 and which greatly limits these latter two contaminants.

These regulations are generally addressed to the users of coatings rather than the manufacturer. Coatings manufacture can in general be conducted with little or no emission of solvents into the atmosphere, but the application and curing of these coatings on finished products such as automobiles and refrigerators require the evaporation of large amounts of solvent and thus fall under these regulations.

The most common systems being developed by coatings companies to meet these regulations are waterborne, powder, electrodeposition, high solids, conforming solvents, and polymer-monomer blends for ultraviolet light cure type of coatings. It is expected that water reducible or water borne coatings will have a major share of the coatings market in the future. Although very few waterborne coatings are devoid of organic solvents, several of the state regulations have exempted water-thinned coatings which contain 20% or less volatile material.

Aqueous dispersion or latex-type coatings contain high molecular weight polymers dispersed as an emulsion in an aqueous medium. Generally, acrylic latex coatings exhibit excellent toughness, good chemical and water resistance and excellent durability. However, the use in industrial coatings has been limited because of certain disadvantages (external thickener required for viscosity control, poor pigment dispersability, low gloss, foaming, complex formulation, and substrate wetting problems). Also, such water dispersions, when used to prepare coatings, generally require additional hardeners to overcome residual emulsifiers and curatives to crosslink the resin where water insoluble coatings are desired. Otherwise, such coatings prepared from a water dispersion would simply bleed away with a water wash.

On the other hand, water reducible polymers can be considered to be ultrafine particles of a molecular weight intermediate between that of emulsion polymers and true solutions. These polymers contain polar groups, which impart a degree of solubility. They are hybrids of emulsion polymers and solution polymers since they possess properties characteristic of both types. The affinity of the resin for water is controlled by the extent of solvation of the polar groups (carboxylic acid moieties in the case of acrylic polymers) in the polymer backbone. Solvation is achieved by pH adjustment and/or the addition of a water miscible polar cosolvent. Water reducible resins can be alkali soluble (containing acidic groups), acid soluble (containing basic groups), or nonionic (containing amide or hydroxyl groups in conjunction with either acid or basic components). The resins of this invention are of the acidic type or ionic.

Coatings made from the water-reducible resins have advantages over emulsion type coatings. They have better flow and leveling characteristics. Pigment dispersibility is easier. Formulation of the coating composition is not as complex, and gloss of the final coating is higher. Another important benefit of the water reducible type of coating is that it may be formed without substantial amounts of surfactant or emulsifying agents, which in large amounts can inhibit the physical properties of the final coating.

Representative of the types of resins presently utilized in water reducible coatings are: alkyd (e.g. U.S. Pat. No. 4,051,089), styrene acrylics, acrylics, and polyesters. This invention is concerned with the acrylic type of resin. Two U.S. Patents on the subject of acrylic water reducible resins are: U.S. Pat. No. 3,862,071 (acrylate-acrylic acid copolymer and metallic flake pigment) and U.S. Pat. No. 3,904,569 (aqueous dispersion containing a carboxylic acid-containing resin and an aliphatic polyamine). Acrylic water reducible resins having both hard and soft segments and to which a plasticizer is added are disclosed in U.S. Pat. No. 4,064,092 of which there are two divisional applications on file (Ser. No. 827,196 and 827,037 now allowed, both filed Aug. 23, 1977).

Adhesion and water resistance have been problems with water reducible resins. Such resins have an affinity for water and coatings derived from them swell upon contact with water. Adhesion may be improved by the addition of plasticizer (e.g. a compatible phthalate), but some plasticizers can be extracted with water or soapy water.

There are various monomers which are known adhesion promoters: vinyl pyridine, 2-ethylhexyl methacrylate, methacrylic acid, dimethyl amino ethyl methacrylate, and isobutoxymethacrylamide. N-vinyl-2-pyrrolidone is known to be a hydrophilic, adhesion promoting monomer. It is known that when N-vinyl-2-pyrrolidone comprises 1 to 20 percent of the monomeric units in a polymer, it can confer characteristics such as strength, dye receptivity and hardness to the polymer. It is also known that N-vinyl 2-pyrrolidone can modify water-swelling equilibrium, melting point, dielectric properties or surface activity. Vinyl pyrrolidone copolymers are also known to give smooth, continuous films with good hardness, stiffness and grease resistance properties.

The research and development which led to this invention were part of an effort to obtain water reducible acrylate coating resins with unusually good adhesion to metal surfaces and water resistance to prevent powdering and cracking. It has been found that the incorporation of from about 0.5 to about 5 percent N-vinyl-2-pyrrolidone into a specific class of acrylate polymers achieves this object better than the other adhesion promoters which were tested.

SUMMARY OF THE INVENTION

A resin is provided which is suitable for use in a water reducible composition which resin comprises, based on 100 weight percent of monomeric units within the polymer: (A) from 0 to about 97% of at least two acrylate monomers selected from the group consisting of methyl acrylate, ethyl acrylate, 2-ethylhexyl acrylate, lauryl acrylate, isodecyl-methacrylate, 2-ethylhexyl methacrylate, butyl acrylate, butyl methacrylate, and isobutyl methacrylate; (B) from 0 to about 95% of a monomer selected from the group consisting of styrene, alpha-methylstyrene, acrylonitrile, vinyl toluene, methyl methacrylate, vinyl chloride, and vinylidene chloride; (C) from about 0.5 to about 5% N-vinyl-2-pyrrolidone; and (D) from about 2 to about 15% of an unsaturated carbonyl compound selected from the group consisting of acrylic acid, methacrylic acid, fumaric acid, itaconic acid, maleic acid and maleic anhydride with the proviso that the total monomeric units must be 100%. Generally, harder coatings are produced from resins containing monomer from Group (B), such as styrene, 20–30% with 60–75% of two monomers from Group (A).

The resins of this invention can be produced by reaction of the monomers in an aqueous emulsion medium. Their synthesis and composition are explained in detail in U.S. patent application Ser. No. 868,258, of Bill B. Gross, filed concurrently with this application and entitled "Carboxylated Vinyl Pyrrolidone Copolymers", hereby incorporated by reference into this application.

A film-forming water reducible composition is prepared using a mixture of the resin with a suitable coalescing solvent and a volatile amine. The starting material for this mixture is preferably the dried resin described above; however, the emulsion reaction product from the resin formation reaction can be used directly without intermediate coagulation and drying steps. In such an operation, the composite would automatically be in a water reduced form, when sufficient amine is used.

Suitable coalescing solvents are those having affinity for both the resin polymer and water (e.g. alcohols, glycol ethers, and ketones). The suitable solvents have a higher boiling point than water so that they are the last solvents to leave the applied coating.

The mixture is actually made water reducible by neutralizing the carboxyl groups of the resin with a suitable volatile amine. The amine, or any volatile base, is added to the resin solvent mixture. It is the neutralized carboxylic acid groups which give the resin affinity for water and actually suspend the resin between both the solvent phase and the water phase. Said amine is selected from primary, secondary, and tertiary amines having a melting point in the range of about −40° C. to about 25° C. and a boiling point in the range of about 50° C. to about 150° C. After the amine is added water may be added as diluent.

When water is added, a stable dispersion is formed having a pH of about 8 to about 14. The resin polymer which is dissolved in an organic solvent undergoes a phase inversion in water to form colloidal particles or micelles which are stable.

The following coating composition typifies the compositions of this invention:

|  | Parts by Weight |
| --- | --- |
| Resin | 20 – 30 |
| Amine | 1 – 3 |
| Defoamer | .2 – .5 |
| Water soluble solvent (e.g. butyl Cellosolve) | 10 – 11 |
| Water insoluble solvent (e.g. MIBK) | 2 – 4 |
| Water | 45 – 60 |

In the above composition, "Resin" means a carboxylated vinyl pyrrolidone copolymer as earlier described; "MIBK" means methyl isobutyl ketone; and butyl Cellosolve is a trademark of Union Carbide Corporation for ethylene glycol monobutyl ether. The water insoluble solvent may be used to depress the viscosity of the composition.

It is possible to operate outside the ratios given. For example, if the resin were made with a high acrylic acid content, the solvent concentration could be greatly decreased and the water concentration greatly increased; however, in doing this water sensitivity of the finished coating is increased, which is not desired. The recipe given covers a good range of practical coating compositions.

The coating compositions of the above recipe yield clear coatings with good adhesion and water resistance. They may also be mixed with aqueous dispersion (latex) type compositions and various pigments and plasticizers.

The actual mechanism of water reducible resins is not thoroughly understood; however, a substantially water insoluble coating is provided on a substrate by application of a coating composition of this invention and drying the applied coating to remove the water, amine, and coalescing solvent. Application is by any of the conventional techniques such as brushing or spraying. The thickness of the applied coating should generally be in the range of about 1 to about 30 mils (0.025–0.762 mm.), preferably from about 1 to about 5 mils (0.025–0.13 mm.). Typical uses for coatings of this type are metal decorative coatings, highly pigmented coatings such as basement sealers, and metal can coatings.

DESCRIPTION OF THE PREFERRED EMBODIMENTS

The resins which are preferred for use in water reducible compositions are those requiring the least number of monomers for their synthesis. This, of course, simplifies the manufacture of the resins.

The coalescing solvent is generally selected from the group consisting of ethylene glycol monomethyl ether, ethylene glycol monoethyl ether, ethylene glycol monobutyl ether, diethylene glycol monobutyl ether, diethylene glycol monoethyl ether acetate, diethylene glycol diethyl ether, ethylene glycol monomethyl ether acetate, dipropylene glycol methyl ether, methyl ethyl ketone, propylene glycol ethyl ether, propylene glycol isopropyl ether, propylene glycol butyl ether, acetone, methyl propyl ketone and diacetone alcohol. Of the various solvents which can be used, generally the ethylene glycol monobutyl ether, ethylene glycol monoethyl ether, diethylene glycol monomethyl ether, diethylene glycol monoethyl ether and diethylent glycol monobutyl ether are preferred. The solvent and resin are usually mixed at a temperature of from about 25° C. to about 80° C., for a period of from about 20 to about 60 minutes.

Representative of the various volatile amines which may be used to form the water reducible compositions are: primary amines such as ethyl amine, propyl amine, butyl amine, isoamyl amine, amyl amine, hexyl amine, heptyl amine and ethanol amine; secondary amines such as diethyl amine, ethyl ethanol amine, and morpholine; and tertiary amines such as dimethylethanol amine, trimethyl amine, triethylamine and N-methyl morpholine. Sufficient amine is added to achieve a pH in the final water dispersion of from about 8 to about 14.

The group insoluble solvent is generally selected from the group consisting of mineral spirits, ketones (such as MIBK), aromatic solvents, and acetates. It is either a true solvent for the resin or forms a true solvent for the resin when it is mixed with the water soluble solvent.

The amount of water used depends on whether a high or a low viscosity dispersion is desired or whether high or low solids content is desired. It also depends on the type and amount of coalescing solvent used. The water is usually mixed with the amine neutralized composition at a temperature of from about 25° C. to about 80° C.

The volume ratio of water to solvent is preferably about 4:1. Here, the term "solvent" refers to all the volatile organic solvent (water soluble solvent, water insoluble solvent, and amine). A lower level of organic solvent may be used if the level of acidic monomer is increased, but this in turn creates water sensitivity in the coating. Solvent level could also be lowered by using plasticizer in place of some of the solvent.

The water, amine and coalescing solvent are evaporated from applied coatings usually at a temperature in the range of about 20° C. to about 100° C., preferably about 25° C. to about 50° C.

Films formed by applying the coating compositions of this invention to substrates are generally dried for a period of from about 8 to about 24 hours.

The invention will be further clarified by a consideration of the following example, which is intended to be purely exemplary of the use of the invention. Unless otherwise stated, parts are parts by weight, and percentages are by weight.

EXAMPLE I

Film forming water reducible coating compositions were prepared by mixing: (A) a resin selected from those in Table 1:

Table 1

| Water Reducible Resin Monomer Components | | | |
|---|---|---|---|
| Resin Type | 2720** | 2731* | 2736** |
| Monomers: (percent) | | | |
| Isobutyl Methacrylate | 71 | 71 | |
| N-Butyl Methacrylate | | | 72.5 |
| Methyl Methacrylate | | | 23 |
| 2-Ethylhexyl Methacrylate | 24 | 24 | |
| Methacrylic Acid | 3 | 3 | 2.5 |
| N-vinyl-2-pyrrolidone | 2 | 2 | 2 |
| | 100 | 100 | 100 |

*Made by continuous monomer addition to reaction.
**Made by batch reaction.

(B) a defoamer comprising 2,4,7,8-tetramethyl-5-decyne-4,7-diol; (C) butyl Cellosolve; (D) MIBK; and (E) triethylamine in the proportions given in Table 3 in parts by weight.

Blends of these various water reducible compositions with aqueous dispersion or latex type coating compositions were made. The polymer emulsified in the latex used was selected from those in Table 2:

Table 2

| Latex Resins | | |
|---|---|---|
| Latex Resin Type | 2457A | 2457C |
| Monomers: (percent) | | |
| n-Butyl Methacrylate | 72.5 | 47.5 |
| 2-Ethylhexyl Acrylate | | 48 |
| Ethyl Acrylate | 23 | |
| Methacrylic Acid | 2.5 | 2.5 |
| N-Vinyl-2-Pyrrolidone | 2 | 2 |
| | 100 | 100 |

The presence of 2-ethylhexyl acrylate makes a relatively soft polymer. The resin latex blends were made by mixing the water reducible coating compositions previously described with latex, water, and a small amount of defoamer. To these coating composition blends were added pigment comprising titanium dioxide slurry (60% solids).

The resulting blends were applied to phosphated steel test plates using a number 30 wire-wrapped coating rod to obtain a film thickness of between 0.8 and 2.5 mils (0.02 to 0.06 mm.). The coating rod was made by RD Specialty Company, Webster, New York and was typical of those used in applying test coatings.

The coatings were then dried at room temperature for two hours, and residual solvent was removed by drying at 49°–54° C. for one-half hour in an oven. The formulations for the water reducible compositions, the resin latex blends, the blends containing pigment, and the test results on coatings made from the latter blends are shown on Table 3:

Table 3

| | Acrylic Resin/Latex Evaluations | | | | | | | | | Controls | |
|---|---|---|---|---|---|---|---|---|---|---|---|
| Sample | A | C | D | F | H | J | L | N | Q | U | V |
| (parts by weight) | | | | | | | | | | | |
| Water reducible composition: | | | | | | | | | | | |
| Resin Type | 2720 | 2720 | 2720 | 2731 | 2731 | 2731 | 2736 | 2736 | 2736 | | |
| Resin (Dry) | 40 | 25 | 12.5 | 40 | 25 | 12.5 | 40 | 25 | 10 | | |
| Water | | | | | | | 70 | 50 | | 45 | 45 |
| Defoamer | 2 | 2 | 2 | 2 | 2 | 2 | 2 | 2 | 2 | 2 | 2 |
| Butyl Cellosolve | 17 | 17 | 17 | 17 | 17 | 17 | 17 | 17 | 17 | 17 | 17 |
| MIBK | 10 | 10 | 10 | 10 | 10 | 10 | 10 | 10 | 10 | 10 | 10 |
| Triethylamine | 2 | 2 | 2 | 2 | 2 | 2 | 2 | 2 | 2 | 2 | 2 |
| Latex Type: | 2457C | 2457C | 2457C | 2457C | 2457C | 2457C | 2457A | 2457A | 2457A | 2457A | 2457C |

Table 3-continued

| Sample | Acrylic Resin/Latex Evaluations | | | | | | | | | Controls | |
|---|---|---|---|---|---|---|---|---|---|---|---|
| | A | C | D | F | H | J | L | N | Q | U | V |
| Latex (40% solids) | 25 | 62.5 | 93.75 | 25 | 62.5 | 93.75 | 25 | 62.5 | 100 | 125 | 125 |
| Water | 105 | 82.5 | 63.75 | 105 | 82.5 | 63.75 | 35 | 32.5 | 60 | | |
| Total parts in blend | 201 | 201.0 | 201.0 | 201 | 201.0 | 201.0 | 201 | 201.0 | 201 | 201 | 201 |
| 60% TiO$_2$ Slurry | 20.8 | 20.8 | 20.8 | 20.8 | 20.8 | 20.8 | 20.8 | 20.8 | 20.8 | 20.8 | 20.8 |
| (parts added to a 100 part blend sample) | | | | | | | | | | | |
| Wt. ratio Red.Resin/Latex Resin | 80/20 | 50/50 | 25/75 | 80/20 | 50/50 | 25/75 | 80/20 | 50/50 | 20/80 | 0/100 | 0/100 |
| Tests: | | | | | | | | | | | |
| Gloss, 60° | 50–52 | 58–60 | 55–60 | 48–50 | 78–80 | 80–85 | 50–55 | 30–40 | 34–35 | 50–52 | 78–80 |
| Reverse Impact: | | | | | | | | | | | |
| Fail - F | F 4" | F 28" | P 28" | F 6" | P 28" | P 28" | F 12" | P 28" | P 28" | P 28" | P 28" |
| Pass - P | P 2" | P 26" | | P 4" | | | P 10" | | | | |

Gloss is the ability of a surface to reflect light regularly. As reported here, gloss is objective gloss (the intensity of light regularly or specularly reflected from the coated samples at a 60° angle of incidence) measured on a Hunter Glossmeter (re: ASTM Method D523).

Reverse impact tests the brittleness, elasticity, adhesion, and ability to stretch of a film. In this test, a weight is dropped on a test panel (with the coated side facing down) on an anvil or striking surface. This is done on an instrument such as a Parlin-du Pont type impact tester or a ball bearing impactor. The inches reported in Table 3 are the various heights to which the weight was raised above the test panel. A coating has passed the test if it does not loosen, crack appreciably, or fall off. An ability to withstand reverse impact from a greater height indicates a better coating.

Samples H and J (with approximately 50/50 and 25/75 blends of water reducible resin and latex resin respectively) performed as well as Control Sample V made with the same latex and better than Control Sample U made with the other latex. The water reducible resin type in Samples H and J (2731) was made by continuous monomer addition; while, the other two resin types were made by batch reactions. The continuous addition technique results in resin polymers closer in composition to the ratio of the raw materials charged. In batch reactions, faster reacting monomers (e.g. methacrylic acid) may react more quickly than the other monomers, forming some polymer molecules which are relatively high in that particular monomeric unit and others which are low. The carboxyl groups are thus said to be "blocked" as opposed to being evenly distributed.

The continuous monomer addition technique is known in the polymerization field and examples of it are in U.S. Pat. Nos. 3,324,066 and 3,966,661. The emulsion polymerization is carried out by: (1) forming an aqueous dispersion of an initial monomeric increment of just a part of the total charge (e.g. 5–20 percent of the monomers) which increment includes at least a part of the acrylate monomers and the unsaturated carbonyl compound: (2) subjecting said dispersion to catalytic and thermal conditions sufficient to induce polymerization; and then (3) adding incrementally or continuously (e.g. 8 to 16 percent per hour) the remainder of the monomers to said dispersion along with catalyst and emulsifier.

Another technique for synthesizing uniform resin polymers is to use a mixture of acrylic and methacrylic acids as the carbonyl compound in a batch reaction system. Acrylic acid reacts more slowly than methacrylic acid and therefore helps to "spread out" the carbonyl groups in the polymer. This method is not quite as effective as continuous monomer addition.

The data indicates that: (1) it is preferable to make the water reducible resins by the technique of continuous monomer addition; (2) it is preferable to make blends with a weight ratio of water reducible resin to latex resin of from about 30/70 to about 70/30, and (3) higher gloss can be obtained using a blend of a resin with a "soft" latex containing 2-ethylhexylacrylate (2457C).

As titanium dioxide pigment is added to resin latex blends, adhesion of the final coating is adversely effected. Plasticizers can be added to the blends to wet the pigment. Plasticizers are thought to be undesirable ingredients because they can be extracted from coatings by solvents. However, in applications other than solvent resistant coatings they are not detrimental.

Coating compositions using plasticizer should contain about 5 to about 10 weight percent plasticizer as a preferred proportion in recipes such as those in Example I. It is desirable that the plasticizer used be a liquid at room temperature and have a sufficiently high boiling point, preferably at least 100° C., and more preferably at least 150° C., so that it will not be volatilized from the final coating.

The plasticizer used should enhance the water insolubility of the final dried coating. Further, it must be compatible with the water reducible resin. For this characterization, a solubility parameter in the range of about 8 to about 11 is required. Such solubility parameter is of the type described in *The Encylopedia of Polymer Science and Technology*, Volume 3, page 854, 1965, John Wiley and Sons, Inc., which is simply determined by the equation $$\delta = (\Sigma F)/V = \Sigma F/MW/d$$

where $\delta$ = solubility parameter $\Sigma F$ = sum of the pertinent molar attraction constants of groups determined by Small, P.A.[J. Appl. Chem. 3, 71, (1953)]

$V$ = Molar volume at 25° C.

$MW$ = molecular weight $d$ = density at 25° C.

Various plasticizers can be used for this purpose. They can, for example, be of the type listed in the Federation Series On Coatings Technology, Unit 22, entitled "Plasticizers," published April, 1974, so long as they fulfill the boiling point and compatibility requirements.

Representative of various plasticizers are cyclic plasticizers such as phosphoric acid esters, phthalic anhydride esters and trimellitic acid esters as well as N-cyclohexyl-p-toluene sulfonamide, dibenzyl sebacate, diethylene glycol dibenzoate, di-t-octylphenylether, dipropane diol dibenzoate, N-ethyl-p-toluene sulfonamide, isopropylidenediphenoxypropanol, alkylated naphthalene, polyethylene glycol dibenzoate, o-p-toluene sulfonamide, trimethylpentanediol dibenzoate and trimethylpentanediol monoisobutyrate monobenzoate.

Representative of various acyclic plasticizers are adipic acid esters, azelaic acid esters, citric acid esters, acetylcitric acid esters, myristic acid esters, phosphoric acid esters, ricinoleic acid esters, acetylricinoleic acid esters, sebacic acid esters, stearic acid esters, epoxidized esters, as well as 1,4-butane diol dicaprylate, butoxyethyl pelargonate di[(butoxyethoxy) ethoxy] methane, dibutyl tartrate, diethylene glycol dipelargonate, diisooctyl diglycolate, isodecyl nonanoate, tetraethylene glycol di(2-ethylbutyrate), triethylene glycol di(2-ethylhexanoate), triethylene glycol dipelargonate and 2,2,4-trimethyl-1,3-pentane diol diisobutyrate.

The scope of this invention includes coating compositions containing the water reducible resins, solvents, and water as described above, as well as other normal coating ingredients such as pigments, alkyds, oils (e.g. pine oil) and thickeners.

Other embodiments of this invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A film forming water reducible coating composition comprising:
    (A) a resin which consists essentially of, based on 100 weight percent of monomeric units within the resin:
        (1) from 0 to about 97 percent of at least two acrylate monomers selected from the group consisting of methyl acrylate, ethyl acrylate, 2-ethylhexyl acrylate, lauryl acrylate, 2-ethylhexyl methacrylate, butyl acrylate, isodecyl methacrylate, butyl methacrylate, isobutyl methacrylate;
        (2) from 0 to about 95 percent of a monomer selected from the group consisting of styrene, α-methylstyrene, acrylonitrile, vinyl toluene, methyl methacrylate, vinyl chloride and vinylidene chloride;
        (3) from about 0.5 to about 5 percent N-vinyl 2-pyrrolidone; and
        (4) from about 2 to about 15 percent of an unsaturated carbonyl compound selected from the group consisting of acrylic acid, methacrylic acid, fumaric acid, itaconic acid, maleic acid, and maleic anhydride; with the proviso that total monomeric units must be 100 percent;
    (B) a coalescing solvent, and
    (C) a volatile amine.

2. The film forming water reducible composition of claim 1 wherein the coalescing solvent is selected from the group consisting of ethylene glycol monomethyl ether, ethylene glycol monoethyl ether, ethylene glycol monobutyl ether, diethylene glycol monobutyl ether, diethylene glycol monoethyl ether acetate, diethylene glycol diethyl ether, ethylene glycol monomethyl ether acetate, dipropylene glycol methyl ether, methyl ethyl ketone, propylene glycol ethyl ether, propylene glycol isopropyl ether, propylene glycol butyl ether, acetone, methyl propyl ketone and diacetone alcohol.

3. The film forming water reducible coating composition of claim 2 wherein the volatile amine is selected from the group consisting of ethyl amine, propyl amine, butyl amine, isoamyl amine, amyl amine, hexyl amine, heptyl amine, ethanol amine, diethyl amine, ethyl ethanol amine, morpholine; dimethylethanol amine, trimethyl amine, triethylamine and N-methyl morpholine.

4. The film forming water reducible coating composition of claim 3 wherein the starting material for the mixture is the emulsion reaction product from the resin formation reaction.

5. The film forming water reducible coating composition of claim 3 wherein the resin in sub-part (A) is in a dry form.

6. The film forming water reducible coating composition of claim 5 to which water has been added in sufficient amount to make the volume ratio of water to solvent approximately 4 to 1.

7. The film forming water reducible coating composition of claim 6 which further comprises a defoamer and a water insoluble solvent and wherein the ingredients are in the following proportions:

|  | Parts by weight |
|---|---|
| Resin | 20 – 30 |
| Amine | 1 – 3 |
| Defoamer | .2 – .5 |
| Water soluble solvent | 10 – 11 |
| Water insoluble solvent | 2 – 4 |
| Water | 45 – 60 |

8. The film forming water reducible coating composition of claim 7 wherein the resin used has been made by the technique of continuous monomer addition.

9. The film forming water reducible coating composition of claim 8 wherein the resin is comprised of 71% isobutyl methacrylate, 24% 2-ethylhexyl methacrylate, 3% methacrylic acid and 2% N-vinyl-2-pyrrolidone.

10. The film forming water reducible coating composition of claim 8 to which has been added a latex coating composition.

11. The film forming water reducible coating composition of claim 10 wherein the weight ratio of water reducible resin solids to latex resin solids is from about 30/70 to about 70/30.

12. The film forming water reducible coating composition of claim 11 wherein the water reducible resin is comprised of 71% isobutyl methacrylate, 24% 2-ethylhexyl methacrylate, 3% methacrylic acid and 2% N-vinyl-2-pyrrolidone.

13. The film forming water reducible coating composition of claim 12 wherein the latex resin is comprised of 47.5% n-butyl methacrylate, 48% 2-ethylhexyl acrylate, 2.5% methacrylic acid and 2% N-vinyl-2-pyrrolidone.

14. The film forming water reducible coating composition of claim 13 to which titanium dioxide pigment has been added, wherein the water soluble solvent is ethylene glycol monobutyl ether, the water insoluble solvent is methyl-isobutyl ketone, the amine is triethylamine, and wherein the ingredients are present in the following proportions:

| Ingredients | Parts by Weight |
|---|---|
| Water reducible resin | 12.5 |
| Defoamer | 1 |
| Ethylene glycol monobutyl ether | 8.5 |
| Methyl-isobutyl ketone | 5 |
| Triethyl amine | 1 |

-continued

| Ingredients | Parts by Weight |
| --- | --- |
| Latex (40% solids) | 31.25 |
| Water | 41.25 |
| TiO$_2$ slurry (60%) | 20.8 |

15. The film forming water reducible coating composition of claim 13 to which plasticizer has been added.

16. The film forming water reducible coating composition of claim 15 wherein the plasticizer has a boiling point of at least 100° C., has a solubility parameter of about 8 to about 11, and comprises about 5 to about 10 weight percent of the coating composition.

* * * * *

UNITED STATES PATENT AND TRADEMARK OFFICE
CERTIFICATE OF CORRECTION

PATENT NO. : 4,124,555
DATED : Nov. 7, 1978
INVENTOR(S) : Bill B. Gross and Michael J. Maximovich It is certified that error appears in the above-identified patent and that said Letters Patent are hereby corrected as shown below:

Column 5, Line 22 - "group" should be "water".

Signed and Sealed this

Fourteenth Day of August 1979

[SEAL]

Attest:

LUTRELLE F. PARKER
Attesting Officer     Acting Commissioner of Patents and Trademarks